G. T. DUNKLIN.
AUTOMATIC CUT-OUT AND COMPENSATING SOCKET.
APPLICATION FILED MAR. 21, 1912.
1,082,683.
Patented Dec. 30, 1913.
2 SHEETS—SHEET 1.
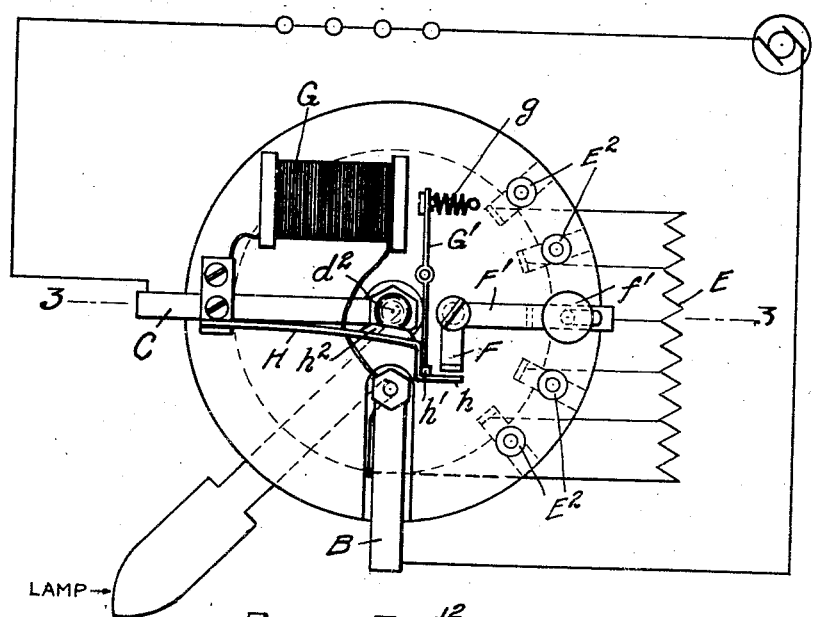
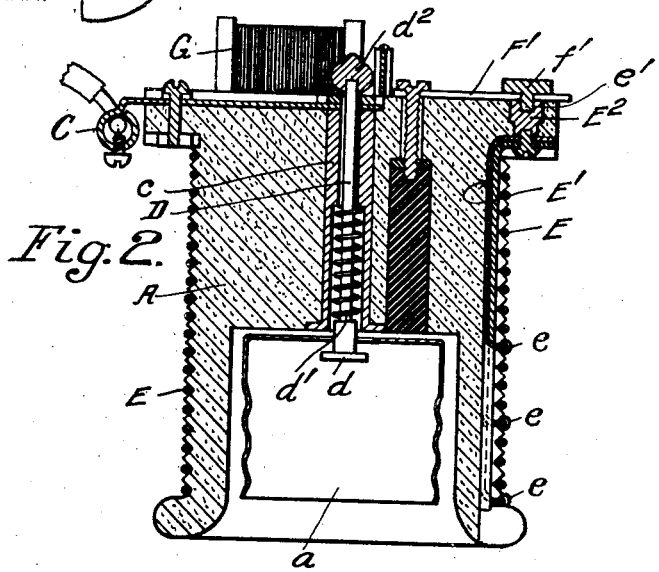
Witnesses:
L. W. Cook.
Floyd A. Wiahl
Gilbert T. Dunklin,
Inventor.
By George J. Oltoch.
Attorney.

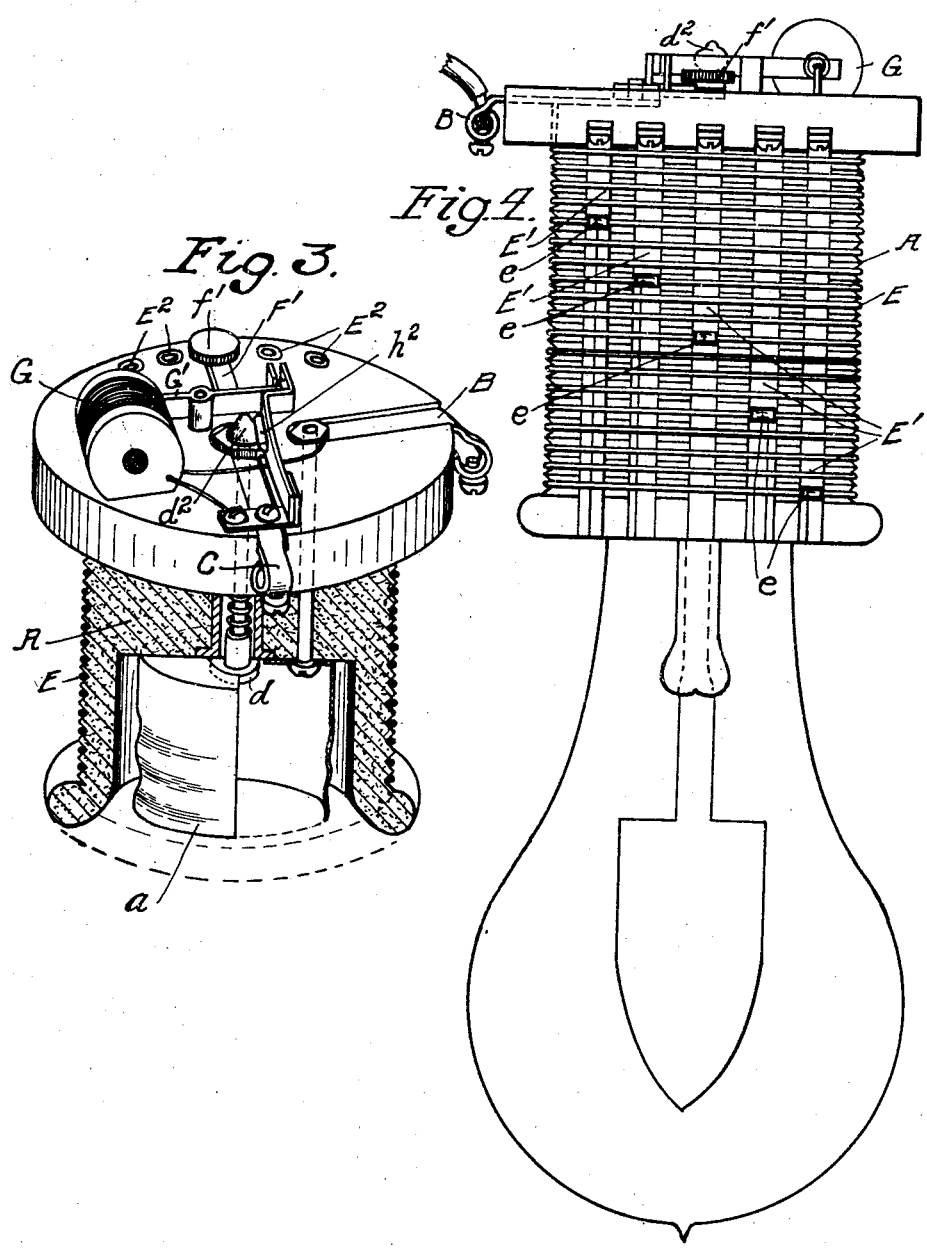

UNITED STATES PATENT OFFICE.

GILBERT T. DUNKLIN, OF SOUTH BEND, INDIANA.

AUTOMATIC CUT-OUT AND COMPENSATING SOCKET.

1,082,683.　　　　　　　Specification of Letters Patent.　　Patented Dec. 30, 1913.

Application filed March 21, 1912. Serial No. 685,231.

*To all whom it may concern:*

Be it known that I, GILBERT T. DUNKLIN, a citizen of the United States, residing at South Bend, in the county of St. Joseph and State of Indiana, have invented certain new and useful Improvements in Automatic Cut-Out and Compensating Sockets, of which the following is a specification.

This invention relates to an improvement in automatic regulators for electric circuits supplying current to several power consuming units connected in series and more particularly to a regulator of this character especially adapted for use in connection with series lighting circuits.

One of the objects of the present invention is the provision of a regulator of this character which will automatically maintain the continuity of the circuit in the event of the failure of any single unit to operate because of the burning out of the lamp or because of the disconnection of such unit, and to provide means for preventing the increase of current in the circuit above the normal current flowing before the failure of such unit.

A further object of the invention is the provision of a regulator of this character embodying means for automatically throwing in to the circuit, upon the failure of any of the units therein, a resistance equal to the resistance of such unit, thus regulating the resistance of the circuit to keep the current constant.

A further object of the invention is the provision of a regulator of this character of such a construction that after the regulator has been actuated by the failure of one of the units of the circuit, it will be automatically restored to its normal position when such unit has been replaced by a new unit.

A further object of the present invention is the provision of a regulator of this character in which means is provided for varying the amount of resistance which is interposed in the circuit upon failure of one of the units thereof, thus rendering the regulator capable of use in connection with various sizes of lamps made for a given current value.

A further object of the invention is the provision of a regulator of this character which is formed as a part of a lamp socket which is adapted for use in connection with the ordinary incandescent lamps.

Other objects of the invention will be apparent from the detailed description hereinafter, when read in connection with the accompanying drawings wherein a convenient embodiment of the invention is illustrated and wherein like characters of reference refer to similar parts in the several views.

In the drawings, Figure 1 is a top plan view of an electric lamp socket provided with the improved regulator, such socket being shown connected in a series lighting circuit; Fig. 2 is a section taken on line 3—3 of Fig. 1, Fig. 3 is a perspective view of the socket illustrated in Fig. 1, parts being broken away. Fig. 4 is a side elevation of the socket illustrated in Fig. 1.

Referring now more particularly to the drawings, A designates the body of an electric lamp socket which is shown connected in a series lighting circuit, such circuit being illustrated diagrammatically. The body A of the lamp socket is conveniently formed of porcelain or other insulating material and is provided with a recess in the base thereof in which is positioned a metallic shell $a$ which is threaded to receive the threaded metallic base of an electric lamp, which constitutes one of the terminals of the lamp. The metallic shell is electrically connected in any convenient manner to a terminal plate B which is conveniently positioned on the top of the body A of the lamp socket and is fashioned for connection with one of the line wires of the circuit.

C designates a second metallic terminal plate which is conveniently secured upon the top of the body A of the lamp socket and is fashioned for connection with the other line wire of the circuit. The terminal plate C is electrically connected to a metallic sleeve $c$ which is mounted within the central portion of the body A of the lamp socket, the lower end of said sleeve extending downwardly to the recess formed in the lower portion of the body A. Positioned within the sleeve $c$ is a plunger D, the lower end of which is provided with a metallic head $d$ which is normally held projected within the metallic shell $a$, by means of a suitable coil spring $d'$ which encircles the plunger D and is interposed between the head $d$ thereof and a suitable shoulder formed in the interior of the sleeve $c$. The upper end of the plunger D projects above the top of the sleeve $c$ and is provided with an enlargement $d^2$ for a purpose to be hereinafter more particularly set forth. With the construction thus described, when a lamp is secured in the socket, the threaded metallic base of the lamp, which constitutes one of the terminals of the lamp will engage the metal shell $a$ of the socket and as the lamp is screwed to position, the other terminal thereof will engage the head $d$ of the plunger D and move the plunger upwardly until the head thereof is caused to contact with the lower end of the sleeve $c$, thus connecting the filament of the lamp in the circuit.

Wound upon the exterior of the body A of the socket is a resistance coil E, the upper end of which is electrically connected to the terminal plate B, and the other end of which, as well as intermediate points thereof, being electrically connected to a contact member F, which is positioned upon the top of the body A of the socket. When the lamp which is secured in the body A of the socket burns out or is removed from the socket, an electrical connection is made between the terminal plate C and the contact member F, as will be hereinafter more particularly set forth, thus throwing the resistance coil E into the circuit to compensate for the resistance of the lamp which has been burned out or removed.

In order to make the socket available for use with various sizes of lamps made for a given current value, means are provided for varying the amount of resistance which is thus introduced into the circuit when a lamp is burned out or removed. To this end a plurality of electrical conductors E' are employed which are conveniently in the form of metal strips disposed in grooves so as to be interposed between the resistance coil E and the body A of the socket, said strips being insulated from the resistance coil by means of strips of fiber or other suitable insulating material secured over the outer faces thereof. The conductors E' are of different lengths and the lower ends $e$ of all of said conductors are electrically connected to various points of the resistance coil E, the longest of said conductors being connected to the extreme lower portion of the resistance coil and the shortest of the conductors being connected to said resistance coil adjacent the top thereof. The upper ends of the conductors E' are connected to a plurality of contact members $E^2$ which are embedded in the top of the body A, said contact members $E^2$ being conveniently arranged in the arc of a circle. Pivotally connected to the contact member F is a switch member F' which is movable over the faces of the contact members $E^2$ which are connected to the conductors E', so that any one of said contact members $E^2$ may be electrically connected with the contact member F. From this construction it will be apparent that the switch member F' may be adjusted to cause either the whole resistance coil E or any desired portion thereof to be thrown into the circuit, so that the same socket is rendered available for use with lamps using different current values. Means is conveniently provided for fastening the switch member F' to any desired one of the contact members $E^2$, and to this end the contact members $E^2$ are conveniently provided with threaded recesses $e'$ therein which are adapted to be engaged by a threaded screw $f'$ carried by the switch member F'.

G designates an electro-magnet connected in shunt with the terminal plates B, and C, said magnet being wound to have a higher resistance than the lamp which is to be used in the socket.

G' designates the armature of the magnet G which is pivotally supported intermediate its end upon the top of the body A of the socket. A suitable spring $g$ connected to the front end of the armature serves to normally hold the same in its retracted position.

H designates a spring contact arm which is secured to the contact plate C and extends transversely of the top of the body A of the socket. The spring contact arm H lies alongside of and extends beyond the upper end of the plunger D and the free end of said arm is bent outwardly and then forwardly to provide an offset part $h$ which is adapted to contact with the contact member F, unless the spring arm is held in a position to prevent such contact. The laterally bent portion of the spring arm H which connects the offset portion $h$ of said arm with the main portion thereof constitutes a back stop for the armature G' of the magnet G, the tail piece of said armature being normally held in engagement with said back stop by its spring $g$. Secured to the offset part $h$ of the spring arm H adjacent the laterally extending part which connects said offset part to the main portion of the arm is a block $h'$ which abuts the end of the tail piece of the armature G' when the same is in its retracted position and said block is of such a thickness that as long as it engages the end of the armature G', the offset portion $h$ of the spring contact arm H will be held out of engagement with the contact member F. The main portion of the spring arm H adjacent the plunger D is provided with a laterally projecting lug $h^2$ which lies in the path of the enlargement $d^2$ at the upper end of the said plunger. The laterally projecting lug $h^2$ of the spring arm is positioned above the enlargement $d^2$ of the plunger when said plunger is in its lowermost position and below said enlargement when the plunger is in its uppermost position.

As long as the lamp burns properly or is not disconnected from the socket, the yieldable contact arm H will be held out of engagement with the contact member F. Should the lamp burn out, however, or the filament thereof be broken, thus placing the winding of the electro-magnet G in series with the circuit, the current will now pass from terminal plate C through the magnet to terminal plate B and from thence to the generator. As the resistance of this magnet is greater than the resistance of the broken lamp, the total resistance of the circuit is momentarily increased, thus reducing the current and protecting the other lamps on the circuit from burning out. Enough current flows, however, to energize the electro-magnet G which at once attracts its armature G', thus moving the tail piece of the armature from off the block $h^2$ carried by the spring arm, and permitting said spring arm to move to a position to bring the offset $h$ thereof into contact with the contact member F. The current following now the course of least resistance will flow from terminal plate C through spring arm H, contact member F, switch F', one of the contact members $E^2$ and the conductor E' connected thereto, the resistance coil E and from thence to terminal plate B. As the regulating resistance introduced by the coil E is equal to the resistance of the burnt-out lamp, the total resistance in the circuit is now restored to its original value before the lamp failed and the electro-magnet G is again in shunt with the terminals C and B. No change now takes place until the burnt-out lamp is renewed. When, however, the burnt-out lamp is removed from the shell $a$ and a new lamp is screwed thereinto, the plunger D will be elevated and the enlargement $d^2$ thereof will engage the lug $h^2$ projecting from the spring arm H and shift said arm laterally, thus moving the offset portion $h$ thereof out of engagement with the contact F and permitting the armature G' to be returned by its spring to a position where it will hold the spring arm out of engagement with the contact F until the new lamp burns out or is removed from its socket.

While I have illustrated a convenient embodiment of the invention, it will be understood that many changes may be made to the form and construction therein shown without departing from the spirit and scope of the invention as defined in the appended claims.

What I claim, is:

1. The combination with an electric circuit, an electric lamp having its terminals connected in series in said circuit, a resistance coil connected with one of the lamp terminals, a contact member connected with the resistance coil, means acting automatically to connect said contact member with the other lamp terminal when the current through the lamp is broken, and means actuated by the replacement of the lamp for breaking the current through said contact member.

2. The combination with an electric circuit, an electric lamp having its terminals connected in series in said circuit, a resistance in series with the terminals of said lamp when the current through the lamp is broken, means including an electro-magnet connected in shunt with the lamp terminals, and means actuated by the replacement of the lamp for automatically throwing the resistance out of circuit.

3. A lamp socket for electric lamps comprising a body provided with terminals adapted for connection in an electric circuit, a resistance coil wound upon the exterior of said body and having one end thereof connected to one of said terminals, automatically operated means for connecting the other terminal with the resistance coil upon rupture of the lamp, and means actuated by the placement of a lamp in the socket for breaking the current through the resistance coil.

4. The combination with an electric circuit, an electric lamp having its terminals connected in series in said circuit, a resistance coil having one end connected to one of the lamp terminals, a contact member, adjustable means for connecting said contact member to different portions of said resistance coil, means acting automatically to connect said contact member to the other lamp terminal when the current through the lamp is broken, said means including an electric magnet connected in shunt with the lamp terminals, and means actuated by the replacement of the lamp for breaking the circuit through said contact member.

5. A lamp socket for electric lamps having terminals adapted for connection in a lamp circuit, a resistance coil carried by the lamp socket and having one end thereof connected to one of the terminals of the socket, a contact member connected to the other end of said resistance coil, a yieldable contact arm connected to the other of said socket terminals and adapted to engage said contact member to connect the resistance coil in series with the socket terminals, a movable member normally lying in the path of said yieldable arm to hold the same out of engagement with said contact member, and a high resistance electro-magnet for shifting said movable member connected in shunt with the socket terminals.

6. A lamp socket for electric lamps having terminals adapted for connection in a lamp circuit, a resistance coil carried by the lamp socket and having one end thereof connected to one of the terminals of the socket, a contact member connected to the other end of said resistance coil, a yieldable contact arm connected to the other of said socket terminals and adapted to engage said contact member to connect the resistance coil in series with the socket terminals, a high resistance electro-magnet connected in shunt with the socket terminals, a pivotal armature for said magnet, a spring for normally holding the armature retracted, said armature being provided with a portion adapted when the armature is retracted to lie in the path of the yieldable arm to hold the same out of engagement with said contact member.

7. A lamp socket for electric lamps provided with a shell for the reception of a lamp and having terminals adapted for connection in an electric circuit, a resistance coil carried by the lamp socket and having one end thereof connected to one end of one of the lamp terminals, a contact member connected to the other end of said resistance, a yieldable contact arm connected to the other of said socket terminals and adapted to engage said contact member to connect the resistance coil in series with the socket terminals, a high resistance electro-magnet connected in series with the socket terminals, a pivotal armature for said magnet, a spring for normally holding the armature retracted, said armature being provided with a portion adapted when the armature is retracted to lie in the path of the yieldable arm to hold the same out of engagement with said contact member, and means for shifting said yieldable arm laterally, said means including a portion normally projecting within the shell of the socket so as to be engaged by a lamp when the same is secured therein.

8. A lamp socket for electric lamps provided with a shell for the reception of a lamp and having terminals adapted for connection in an electric circuit, a resistance coil carried by the lamp socket and having one end thereof connected to one end of one of the lamp terminals, a contact member connected to the other end of said resistance, a yieldable contact arm connected to the other of said socket terminals and adapted to engage said contact member to connect the resistance coil in series with the socket terminals, a high resistance electro-magnet connected in shunt with the socket terminals, a pivoted armature for said magnet, a spring for normally holding the armature retracted, said armature being provided with a portion adapted when the armature is retracted to lie in the path of the yieldable arm to hold the same out of engagement with said contact member, a plunger movably supported in the socket, and a spring for normally holding said plunger with the lower end thereof projecting into the shell of the socket, said plunger and yieldable arm being provided with coöperating portions for causing a lateral movement of the arm when the plunger is shifted.

9. A lamp socket for electric lamps comprising a body provided with terminals adapted for connection in an electric circuit, a resistance coil wound upon the exterior of said body and having one end thereof connected to one of the socket terminals, and means for connecting the other end of said resistance coil to the other terminal of the lamp socket, said means including an electro-magnet connected in shunt with the socket terminals.

In testimony whereof I affix my signature in presence of two witnesses.

GILBERT T. DUNKLIN.

Witnesses:
L. W. HAMMERSCHMIDT,
L. W. COOK.